United States Patent [19]
Paech

[11] Patent Number: 5,923,124
[45] Date of Patent: Jul. 13, 1999

[54] REVERSE GEAR WARNING LIGHT CIRCUIT FOR MOTOR VEHICLES

[76] Inventor: Eberhard Paech, Gelferstrasse 37, D-14195 Berlin, Germany

[21] Appl. No.: 08/902,435

[22] Filed: Jul. 29, 1997

[30] Foreign Application Priority Data

Mar. 5, 1997 [DE] Germany ........................ 297 03 950 U

[51] Int. Cl.[6] .................................................... B60Q 1/46
[52] U.S. Cl. .......................... 315/80; 307/10.8; 340/463; 340/468
[58] Field of Search .............................. 315/80; 307/10.8; 340/463, 468

[56] References Cited

U.S. PATENT DOCUMENTS

| | | | |
|---|---|---|---|
| 3,037,188 | 5/1962 | Weigl | 340/463 |
| 4,970,493 | 11/1990 | Yim | 340/463 X |

FOREIGN PATENT DOCUMENTS

WO 87/01342  3/1987  WIPO ..................................... 340/463

*Primary Examiner*—Robert Pascal
*Assistant Examiner*—Justin P. Bettendorf
*Attorney, Agent, or Firm*—Notaro & Michalos P.C.

[57] ABSTRACT

Electrical warning light circuitry for motor vehicles has a manually actuatable switch which in the ON position causes at least four blinking lights of the motor vehicle to be switched on simultaneously and to blink in intervals. This circuitry is made to operate with every shifting of a shift lever of the motor vehicle into reverse gear with the ignition switched on. For this purpose a switching device electrically coupled with the warning light circuitry is provided, which in the locked position of the gear shift lever into reverse gear is in operating position and via which the blinking lights are switched on simultaneously and at intervals, without switching on the manually actuatable switch.

1 Claim, 1 Drawing Sheet

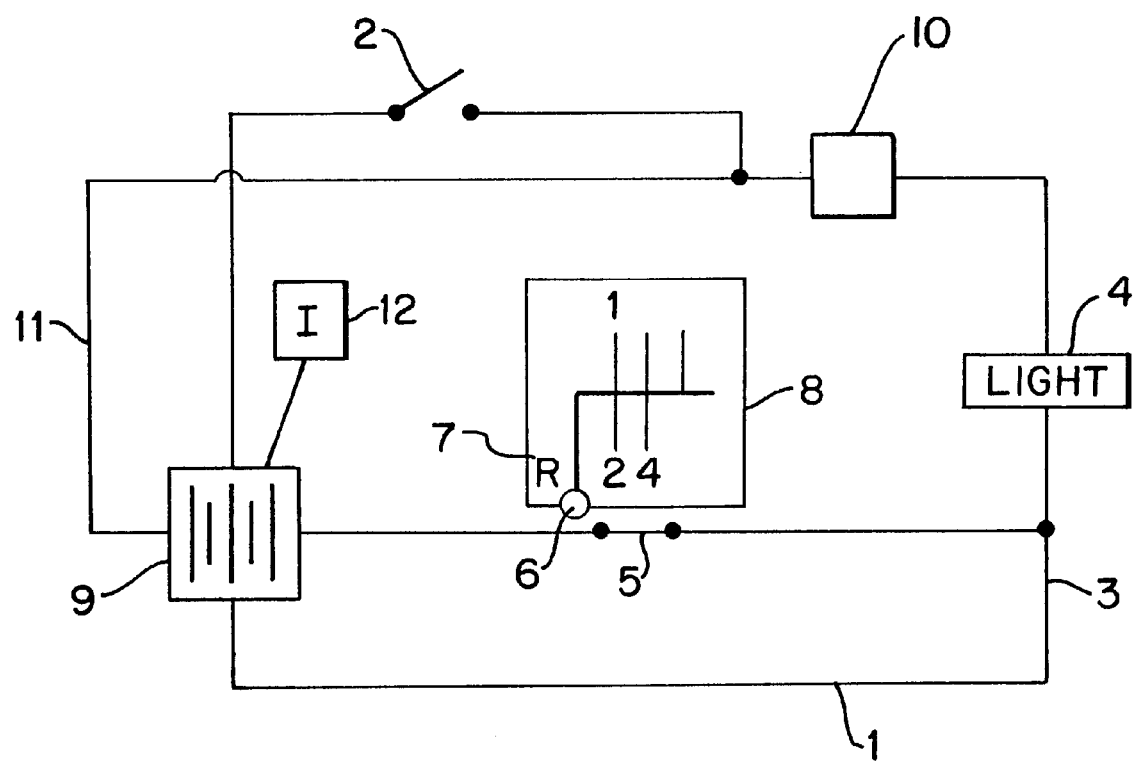

REVERSE GEAR WARNING LIGHT CIRCUIT FOR MOTOR VEHICLES

FIELD AND BACKGROUND OF THE INVENTION

The present invention relates to an electrical warning light circuitry for motor vehicles, with a manually actuatable switch in the circuit. The circuit has at least four blinking lights which can be individually switched on manually, and switching transistors associated with the lights. In the ON position of the switch the blinking lights are simultaneously switched on and blink in intervals.

Motor vehicles are conventionally equipped with warning light circuitry of the above type, which, under conditions of danger, such as in the event of a breakdown, a flat tire, being at the tail end of a traffic jam and similar situations, is switched on by a manually actuatable switch so that blinking lights provided on the motor vehicle, blink simultaneously at intervals and specifically are usually yellow/orange lights.

In the case of trucks, margin lights are additionally provided at upper and outer locations around the tailgate, which serve as the blinking lights. The tailgate can be folded out and lowered and is most often implemented as a hydraulic ramp. The margin or position lights are integrated into the circuit of the electrical warning light circuitry and clearly mark the extended space occupied by the vehicle when the rear tailgate/hydraulic ramp is lowered, for others in the traffic.

The simultaneous blinking at intervals of the warning lights of a motor vehicle, has the advantage that the interval light effect can be perceived by traffic participants even when the corresponding motor vehicle is not directly seen.

SUMMARY OF THE INVENTION

The present invention builds on the usefulness of this warning light effect, for motor vehicle which are moving in reverse. Accident statistics document that, in particular for city traffic, when backing out of, for example, garage doors, parking spaces and the like, accidents occur relatively frequently for the reason that reverse-driven motor vehicles frequently cannot be seen directly by the moving traffic flow. The signal effect of existing white rear back-up lights of motor vehicles which are switched on automatically when the particular vehicle is placed into reverse, is not satisfactory, especially when driving in reverse out of a garage.

The invention therefore addresses the problem of making available an electrical warning light circuitry for motor vehicles according to the above described type, which, every time the gear shift lever of the motor vehicle is shifted into reverse gear with the ignition turned on, the blinking warning lights are also activated.

The problem is solved according to the invention in that a switching device coupled with the warning light circuitry is provided which, in a locked position of the motor vehicle gear shift lever in reverse gear of the motor vehicle transmission and with the vehicle ignition switched on, is in an operating position, and via the blinking lights in the circuit, are simultaneously switched on to blink in intervals.

The switching device is preferably additionally coupled with the circuit for the motor vehicle rear lights.

The switching device can be implemented electromechanically or electronically.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

BRIEF DESCRIPTION OF THE DRAWINGS

The only FIGURE in the drawing is a schematic diagram of the circuit according to the invention.

DESCRIPTION OF THE PREFERRED EMBODIMENTS

In conjunction with the sole FIGURE of the drawing which schematically depicts a basic electrical warning light circuitry, the invention will be described in detail.

A manually actuatable switch 2 is provided in a circuit 3 connected in series with a motor vehicle battery 9, an electric switching transister or relay 10 and the blinking lights 4 of the usual warning light circuitry 1. If switch 2 is switched on (closed), the at least four blinking lights 4 of the motor vehicle, which are connected in parallel and are subsequent to the switching transistor 10 in the circuit 3, are made to light up simultaneously and at intervals, such as occurs usually in the event of a dangerous condition, in order to warn other road users.

According to the invention, with each locking of a motor vehicle shift lever 6 into a reverse gear position 7 (R) of the motor vehicle transmission 8, and with an ignition switched I, on via ignition means 12, the closure of the circuit is carried out via another switch or switching device 5, integrated into a second circuit 11 for automatically switching on the transistor 10 and the blinking lights 4 of the warning light circuitry 1. Transmission 8 also has forward gears such as first through fifth gears. Circuit 11 contains gear switch means 5, battery 9, transister 10 and lights 4, connected in series.

According to the invention, with each shifting into reverse gear 7 and each resulting reverse movement of the motor vehicle, the attention of other road users is called to the reversing motor vehicle through the periodically blinking warning lights, even if the vehicle itself, when moving in reverse out of a garage exit or a parking space, cannot be seen directly by the other road users. Through the relatively simple additional switching measures which can be retrofitted without large expenditures in the case of conventional electrical warning light circuitry in motor vehicles, thus assurance of greater traffic safety is given.

While a specific embodiment of the invention has been shown and described in detail to illustrate the application of the principles of the invention, it will be understood that the invention may be embodied otherwise without departing from such principles.

What is claimed is:

1. An electrical warning light circuitry for a motor vehicle having a battery, an ignition switch for activating the vehicle and a transmission with a shift lever and at least one reverse gear position into which the shift lever is movable to put the transmission into reverse, the circuitry comprising:

at least four blinking warning lights connected to the battery for blinking simultaneously and at intervals;

electric switching means connected in series with the lights for activating the lights to blink simultaneously and at intervals;

a manual switch connected in series with the lights, the electric switching means and the battery forming a first circuit, the manual switch being closable for closing the first circuit to activate the lights;

a switching device which is one of electromechanical or electronic, the switching device operatively connected to the transmission for closing when the shift lever is in the reverse gear position and the ignition switch has activated the vehicle, the switching device being electrically coupled to the warning lights, the electric switching means, a circuit for rear lights of the vehicle and the battery to form a second circuit for activating the warning lights for blinking simultaneously and at intervals without closing the manual switch.

* * * * *